US008606316B2

(12) United States Patent
Evanitsky

(10) Patent No.: US 8,606,316 B2
(45) Date of Patent: Dec. 10, 2013

(54) PORTABLE BLIND AID DEVICE

(75) Inventor: Eugene Evanitsky, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 897 days.

(21) Appl. No.: 12/603,208

(22) Filed: Oct. 21, 2009

(65) Prior Publication Data
US 2011/0092249 A1 Apr. 21, 2011

(51) Int. Cl.
*H04M 1/00* (2006.01)
(52) U.S. Cl.
USPC .............................. 455/556.1; 348/62; 348/63
(58) Field of Classification Search
USPC ...................................................... 455/556.1
See application file for complete search history.

(56) References Cited

U.S. PATENT DOCUMENTS

| | | | | | |
|---|---|---|---|---|---|
| 4,712,003 | A | * | 12/1987 | Ban et al. | 250/221 |
| 5,280,265 | A | * | 1/1994 | Kramer et al. | 338/210 |
| 5,341,346 | A | * | 8/1994 | Youlton | 367/99 |
| 5,442,729 | A | * | 8/1995 | Kramer et al. | 704/271 |
| 5,487,669 | A | * | 1/1996 | Kelk | 434/112 |
| 5,806,017 | A | * | 9/1998 | Hancock | 701/428 |
| 5,813,406 | A | * | 9/1998 | Kramer et al. | 600/595 |
| 5,878,154 | A | * | 3/1999 | Schimmelpfennig | 382/114 |
| 5,936,528 | A | * | 8/1999 | Kobayashi et al. | 340/572.5 |
| 5,973,618 | A | * | 10/1999 | Ellis | 340/990 |
| 6,035,274 | A | * | 3/2000 | Kramer et al. | 704/270 |
| 6,055,048 | A | * | 4/2000 | Langevin et al. | 356/237.1 |
| 6,115,482 | A | * | 9/2000 | Sears et al. | 382/114 |
| 6,184,847 | B1 | * | 2/2001 | Fateh et al. | 345/8 |
| 6,198,395 | B1 | * | 3/2001 | Sussman | 340/573.1 |
| 6,278,441 | B1 | * | 8/2001 | Gouzman et al. | 345/163 |
| 6,298,010 | B1 | * | 10/2001 | Ritz et al. | 367/116 |
| 6,301,050 | B1 | * | 10/2001 | DeLeon | 359/618 |
| 6,356,210 | B1 | * | 3/2002 | Ellis | 340/990 |
| 6,469,956 | B1 | * | 10/2002 | Zeng | 367/116 |
| 6,489,605 | B1 | * | 12/2002 | Ritz et al. | 250/221 |
| 6,591,008 | B1 | * | 7/2003 | Surve et al. | 382/162 |
| 6,608,677 | B1 | * | 8/2003 | Ray et al. | 356/301 |
| 6,701,296 | B1 | * | 3/2004 | Kramer et al. | 704/270 |
| 6,762,749 | B1 | * | 7/2004 | Gouzman et al. | 345/163 |
| 6,763,148 | B1 | * | 7/2004 | Sternberg et al. | 382/293 |
| 6,774,788 | B1 | * | 8/2004 | Balfe | 340/539.13 |
| 7,039,522 | B2 | | 5/2006 | Landau | |
| 7,190,263 | B2 | * | 3/2007 | McKay et al. | 340/539.1 |
| 7,267,281 | B2 | * | 9/2007 | Hopkins | 235/462.45 |
| 7,308,314 | B2 | * | 12/2007 | Havey et al. | 607/54 |
| 7,439,848 | B2 | * | 10/2008 | Mantri | 340/384.7 |
| 7,467,746 | B2 | * | 12/2008 | Olmos et al. | 235/449 |
| 7,477,780 | B2 | * | 1/2009 | Boncyk et al. | 382/165 |
| 7,482,937 | B2 | * | 1/2009 | Chai et al. | 340/576 |
| 7,525,034 | B2 | * | 4/2009 | Nease et al. | 84/485 R |

(Continued)

*Primary Examiner* — Hai V Nguyen
(74) *Attorney, Agent, or Firm* — Luis M. Ortiz; Tuesday A. Kaasch; Kermit D. Lopez

(57) ABSTRACT

A blind aid device including enabling a blind person to activate the blind aid device; capturing one or more images related to a blind person's surrounding environment; detecting moving objects from the one or more images captured; identifying a finite number of spatial relationships related to the moving objects; analyzing the one or more images within the blind aid device to classify the finite number of spatial relationships related to the moving objects corresponding to predefined moving object data; converting select spatial relationship information related to the one or more analyzed images into audible information; relaying select audible information to the blind person; and notifying the blind person of one or more occurrences predetermined by the blind person as actionable occurrences.

20 Claims, 3 Drawing Sheets

(56) References Cited

U.S. PATENT DOCUMENTS

| | | | |
|---|---|---|---|
| 7,565,139 B2 * | 7/2009 | Neven et al. | 455/414.3 |
| 7,598,976 B2 * | 10/2009 | Sofer et al. | 348/62 |
| 7,706,212 B1 * | 4/2010 | Campbell | 367/116 |
| 7,809,074 B2 * | 10/2010 | Kotecha et al. | 375/267 |
| 7,881,662 B2 * | 2/2011 | Banatre et al. | 455/13.1 |
| RE42,336 E * | 5/2011 | Fateh et al. | 345/8 |
| 7,957,224 B2 * | 6/2011 | Tremper | 367/116 |
| 8,068,644 B2 * | 11/2011 | Tkacik | 382/114 |
| 8,094,834 B1 * | 1/2012 | Brungart | 381/92 |
| 8,175,331 B2 * | 5/2012 | Nagaoka et al. | 382/103 |
| 8,199,846 B2 * | 6/2012 | Kotecha et al. | 375/267 |
| 8,218,020 B2 * | 7/2012 | Tenchio et al. | 348/211.3 |
| 8,331,628 B2 * | 12/2012 | Stylianou et al. | 382/114 |
| 8,345,095 B2 * | 1/2013 | Oizumi et al. | 348/118 |
| 2001/0056342 A1 * | 12/2001 | Piehn et al. | 704/3 |
| 2003/0063776 A1 * | 4/2003 | Sato | 382/106 |
| 2003/0179133 A1 * | 9/2003 | Pepin et al. | 342/357.08 |
| 2004/0018838 A1 * | 1/2004 | Chang | 455/432.3 |
| 2004/0076249 A1 * | 4/2004 | Comparsi De Castro et al. | 375/350 |
| 2004/0136571 A1 * | 7/2004 | Hewitson et al. | 382/114 |
| 2005/0004801 A1 | 1/2005 | Liebermann | |
| 2005/0060740 A1 * | 3/2005 | Stecyk | 725/28 |
| 2005/0140544 A1 * | 6/2005 | Hamel et al. | 342/357.08 |
| 2005/0212685 A1 | 9/2005 | Gordon | |
| 2005/0240253 A1 * | 10/2005 | Tyler et al. | 607/134 |
| 2006/0129308 A1 * | 6/2006 | Kates | 701/200 |
| 2006/0161218 A1 * | 7/2006 | Danilov | 607/45 |
| 2006/0241718 A1 * | 10/2006 | Tyler et al. | 607/45 |
| 2006/0289624 A1 * | 12/2006 | Olmos et al. | 235/375 |
| 2007/0003162 A1 * | 1/2007 | Miyoshi et al. | 382/276 |
| 2007/0005245 A1 * | 1/2007 | Ellis | 701/213 |
| 2007/0016425 A1 * | 1/2007 | Ward | 704/271 |
| 2007/0043585 A1 * | 2/2007 | Matos | 705/1 |
| 2007/0081262 A1 * | 4/2007 | Oizumi et al. | 359/843 |
| 2007/0085993 A1 * | 4/2007 | Brown, Jr. | 356/3 |
| 2007/0111704 A1 | 5/2007 | Linkert et al. | |
| 2007/0250119 A1 * | 10/2007 | Tyler et al. | 607/2 |
| 2008/0009772 A1 * | 1/2008 | Tyler et al. | 600/595 |
| 2008/0148030 A1 * | 6/2008 | Goffin | 713/1 |
| 2008/0225960 A1 * | 9/2008 | Kotecha et al. | 375/259 |
| 2008/0228239 A1 * | 9/2008 | Tyler et al. | 607/45 |
| 2009/0055192 A1 | 2/2009 | Liebermann | |
| 2009/0079553 A1 * | 3/2009 | Yanagi et al. | 340/435 |
| 2009/0191839 A1 | 7/2009 | Cannon, Jr. | |
| 2009/0306741 A1 * | 12/2009 | Hogle et al. | 607/54 |
| 2009/0312808 A1 * | 12/2009 | Tyler et al. | 607/2 |
| 2009/0312817 A1 * | 12/2009 | Hogle et al. | 607/54 |
| 2010/0128131 A1 * | 5/2010 | Tenchio et al. | 348/207.1 |
| 2010/0286653 A1 * | 11/2010 | Kubel et al. | 604/504 |
| 2011/0053559 A1 * | 3/2011 | Klein | 455/411 |
| 2011/0065074 A1 * | 3/2011 | Duffy | 434/236 |
| 2011/0066068 A1 * | 3/2011 | Duffy | 600/558 |
| 2011/0112837 A1 * | 5/2011 | Kurki-Suonio et al. | 704/235 |
| 2012/0164982 A1 * | 6/2012 | Klein | 455/411 |
| 2012/0190386 A1 * | 7/2012 | Anderson | 455/456.3 |

\* cited by examiner

PORTABLE BLIND AID DEVICE

BACKGROUND

1. Field of the Related Art

The present disclosure relates to a blind aid device employing motion detection, image recognition, and voice recognition capabilities.

2. Background of the Related Art

People without the sense of sight live in a difficult world. The simple act of walking from one place to another becomes difficult and often dangerous. Walking canes and seeing-eye dogs are helpful for avoiding some obstacles, but do not solve the larger problem of navigation and situational-awareness (e.g., there is a window on the left, a table on the right, there is a bus approaching, etc.). Reading signs and printed materials present additional problems. People who are blind rely heavily on their auditory senses to make sense of the world's ongoings, especially in an urban environment.

According to statistics, over 1.1 million people in the United States are legally blind, and at least an additional 10 million have vision conditions which are not correctable by glasses. A great deal of research has been focused on finding ways to aid the blind in "reading" and "seeing." In addition to more familiar techniques such as Braille, substantial work has been done in presenting printed materials to the blind in the form of coded sounds. Generally speaking, devices of this type, often called optophones, convert a light image of the material to be "read" into a corresponding electrical signal using optical-electronic transducers such as photo-cells. This electrical signal is used to control the output of a variable frequency oscillator or oscillators so that a distinctive tone is generated.

Thus, for someone who is completely unable to use a normal screen or read a printed text, there are two alternatives: Braille reading or speech. Currently available assistance for blind and visually impaired people comprises a wide range of technical solutions, including document scanners and enlargers, interactive speech software and cognitive tools, screen reader software and screen enlargement programs. Moreover, cell phones remain an important part of blind peoples' lives, in spite of their disabilities.

SUMMARY

It is an aspect of the present disclosure to provide a blind aid device including an image capturing module for capturing one or more images related to a blind person's surrounding environment; an image analysis module in operable communication with the image capturing module, the image analysis module configured to (i) detect moving objects from the one or more images captured, (ii) identify a finite number of spatial relationships related to the moving objects, and (iii) analyze the one or more images within the blind aid device to classify the finite number of spatial relationships related to the moving objects corresponding to predefined moving object data; a conversion module for converting select spatial relationship information related to the one or more analyzed images into audible information; and a bidirectional communication module for relaying select audible information to the blind person to notify the blind person of one or more occurrences predetermined by the blind person as actionable occurrences.

It is another aspect of the present disclosure to provide a method for operating a blind aid device including enabling a blind person to activate the blind aid device; capturing one or more images related to a blind person's surrounding environment; detecting moving objects from the one or more images captured; identifying a finite number of spatial relationships related to the moving objects; analyzing the one or more images within the blind aid device to classify the finite number of spatial relationships related to the moving objects corresponding to predefined moving object data; converting select spatial relationship information related to the one or more analyzed images into audible information; relaying select audible information to the blind person; and notifying the blind person of one or more occurrences predetermined by the blind person as actionable occurrences.

The present disclosure also provides a computer-readable medium which stores programmable instructions configured for being executed by at least one processor for performing the methods described herein according to the present disclosure. The computer-readable medium may include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
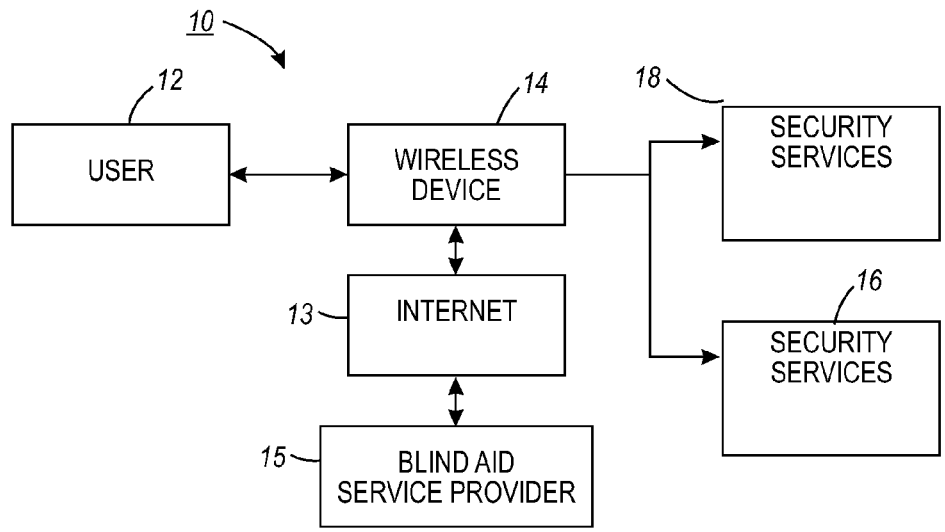
FIG. 1 is a block diagram of a blind aid system employing a wireless device in communication with a security provider and security services, in accordance with the present disclosure.

It would be highly advantageous to employ the advantages of wireless technology to provide new and enhanced aids for blind people. It would be desirable to enable blind people to easily and conveniently perceive their immediate environment and access information related to that immediate environment on a continuous basis in real-time.

In the following detailed description, example embodiments disclosing specific details are set forth in order to provide an understanding of the present disclosure. The example embodiments are set forth for purposes of explanation and not limitation. Those of ordinary skill in the art will understand that various changes in form and details may be made to the example embodiments without departing from the scope of the present disclosure. Moreover, descriptions of well-known devices, methods, systems, and protocols may be omitted so as to not obscure the description of the example embodiments. Nonetheless, such devices, methods, systems and protocols that are within the purview of those of ordinary skill in the art are contemplated by the example embodiments.

The present disclosure provides a blind aid system that takes advantage of personal wireless technology to provide enhanced perception capabilities for blind individuals. The blind aid system includes a wireless communications device, which may be for example a cell phone or a personal digital assistant (PDA). A security provider may optionally be provided that is capable of responding to contact from a blind user of the wireless communications device to ascertain the identity and the location of the blind user of the wireless communications device. The security provider may then contact an emergency response center to provide aid to the blind user of the wireless communications device. The present disclosure further describes a cell phone with a new and novel set of capabilities based around image enabled, network connected devices and technologies. The camera on the cell phone may be used to interpret images and immediate surroundings and relay that information back to the user in an audible format in a continuous manner and in real-time.

The present disclosure further combines image analysis with voice recognition, GPS functionality, network connectivity and other technologies, to produce a set of services that is intended to help blind people with simple day-to-day functions and to decrease their reliance on others. Most of the capabilities may be built directly into the phone but other capabilities may rely on an interface to cloud-based or hosted services because of the need for greater computing power. Features that require immediate response may reside on the phone, whereas features that may take a few seconds may be remote. One skilled in the art may contemplate which functions should require immediate response time and which functions may include a time-delay.

In accordance with a further aspect of the disclosure, the security provider may be capable of automatically ascertaining the location of the user of the wireless communications device in response to the contact, for example via a global positioning system (GPS). According to a further aspect of the disclosure, the wireless communications device may be capable of capturing and analyzing images in a real-time, continuous, and automatic manner. The security provider may be further capable of ascertaining information about the blind user's situation in response to the captured and analyzed images automatically provided by the cell phone. The cell phone may continuously record the immediate surrounding's of the blind user. However, the recording may take place by allowing the blind user to push a button on the cell phone. In other words, the user is permitted to control when the cell phone should keep track of the immediate surroundings of the blind user.

In accordance with an example embodiment, the cell phone described augments several existing cell phone capabilities with new ones by integrating the camera and GPS functions with visualization software and hosted services. Existing capabilities may include: reading a caller ID of an incoming call, dialing a number from the phone's contacts directory, adding and editing entries in the contacts directory, reading and writing text messages and e-mail, reading and writing documents using office software, accessing the Internet, and/or controlling speech volume and rate of speech.

Additional capabilities to be incorporated may include: using the phone to scan the user's surroundings and interpret what it captures and then convert it into words. If the information that the camera captures may be combined with the location of the device (GPS) then even more details may be provided to the user. The system may further determine dangerous situations (e.g., fire or smoke, on-coming vehicles, do not walk signals or any type of traffic signal interpretation), maintenance equipment and/or drop offs (curbs or other obstacles). The system may further determine if the user has fallen over and requires assistance that it may dispatch by using the communication capability of the device, and the system may describe and recognize people that are approaching and/or standing near the blind user of the wireless device.

For example, the phone may indicate to the user that someone is standing in their vicinity. The system may further recognize the person and the phone may announce the guest. If the phone cannot recognize the guest, then the blind person could ask who it is. If the person answers, then the phone may record their image and their voice to use next time the phone detects them. Identification may be based on visual image or voice patterns or both. All command could be voice activated and could apply to the phone or to the person approaching. The phone could also identify multiple people and situations. Moreover, GPS and mapping may be integrated into the phone.

Additional capabilities may include: visual interpretation of camera images (movie or still photos, stationary images or panned images), voice analysis to help identify people, objects (e.g., running motor) or conditions (e.g., fire, oncoming vehicle), activation by voice commands in response to headset in a user's ear, GPS location integrated with visual image from camera, approximate height measurements, approximate distance from object or destination measurements, approaching or receding objects, depth perception, and/or recognizing vehicles (e.g., bus, cab or subway train to verify correct one).

In accordance with an example embodiment, the cell phone described enables advanced image analysis and image recognition. These are for functions that do not require instantaneous response and/or may require more computing cycles to process. For example, these functions may include: image analysis to recognize people, objects and situations, image/video analysis to detect motion, the ability to analyze a panned image in search of a specific object, ability to recognize color, heights and distances, ability to read documents or displays and extract data, ability to read bar codes, and ability to execute verbal transactions.

Prior to describing the present disclosure in further detail, it will first be helpful to define various terms that will be used throughout the following discussion. For example:

The term "image" may refer to a picture taken by an image capturing device. The term "image" may also refer to still images (static images) or moving images, such as movies, videos, etc. The term "image" may refer to any type of visual or non-visual (e.g., acoustical) data or information collected or gathered by the image capturing device. The term "image" may refer to any type of collection of facts, observations, or measurements from which conclusions may be drawn.

The term "storage" may refer to data storage. "Data storage" may refer to any article or material (e.g., a hard disk) from which information is capable of being reproduced, with or without the aid of any other article or device. "Data storage" may refer to the holding of data in an electromagnetic form for access by a computer processor. Primary storage is data in random access memory (RAM) and other "built-in" devices. Secondary storage is data on hard disk, tapes, and other external devices. "Data storage" may also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "module" may refer to a self-contained component (unit or item) that is used in combination with other components and/or a separate and distinct unit of hardware or software that may be used as a component in a system, such as a portable blind aid system including motion detection and image recognition capabilities. The term "module" may also refer to a self-contained assembly of electronic components and circuitry, such as a stage in a computer that is installed as a unit.

The term "analyze" may refer to determining the elements or essential features or functions or processes of one or more portable blind aid devices for computational processing. The term "analyze" may further refer to tracking data and/or collecting data and/or manipulating data and/or examining data and/or updating data on a real-time basis in an automatic manner and/or a selective manner and/or manual manner.

The term "notification" may refer to a visual or audible indication alerting the user of various status conditions relating to portable blind aid systems. "Notification" is the act of notifying someone of something or making a formal announcement. "Notification" may also refer to the warning or announcing of something, usually done in advance.

The term "processing" may refer to determining the elements or essential features or functions or processes of one or more portable blind aid devices for computational processing. The term "process" may further refer to tracking data and/or collecting data and/or manipulating data and/or examining data and/or updating data on a real-time basis in an automatic manner and/or a selective manner and/or manual manner.

The term "software application" may refer to any type of tool that functions and is operated by means of a computing device/component, with the purpose of supporting or improving the software user's work/tasks. The term "software application" may also refer to a subclass of computer software that employs the capabilities of a computer directly and thoroughly to a task that the user wishes to perform. The term "software application" may further refer to a program or group of programs designed for end users. Application software may include any type of database programs, word processing programs, and/or spreadsheet programs.

With reference to FIG. 1, a block diagram of a blind aid system employing a wireless device in communication with a security provider and security services, in accordance with the present disclosure is presented.

In FIG. 1, the system is designated generally by reference numeral 10 and includes a user 12 and a wireless device 14 in communication with a security provider 16 and security services 18. The system 10 further includes an Internet connection 13 between the wireless device 14 and a blind aid service provider 15.

Regarding the system 10, a user 12 may use a wireless device 14 (e.g., a cell phone or other mobile device having a camera) as a simple, low cost, low feature, low to medium blind aid device 10. The user 12 may aim the camera 24 (see FIG. 2), which could be partially concealed, at a door or window of a room (e.g. hotel room or in a car). If the camera 24 detects a situation or condition, for example, motion, fire or a struggle, then it triggers an alarm or notification. The exemplary embodiments utilize the wireless device's 14 built in ability to record moving images, take still photos, and to communicate bi-directionally.

A user 12 may carry the wireless device 14 to any destination and the wireless device 14 may be any of several known types. For example, the wireless device 14 may be a cellular phone employing, for example but not limited to, CMTS, UMTS, or GSM cellular technology.

The wireless device 14 may optionally be in wireless contact with a security provider 16. The security provider 16 may be employed within an existing service provider, such as a cellular phone service provider, or a wireless networking provider, or a satellite phone or networking provider.

The security provider 16 may optionally be in communication with security services 18 (e.g., emergency response center). The security services 18 may be any of, and not limited to, a police station, a fire station, a hospital or paramedics, and/or a private security company. Of course, one skilled in the art may determine that the wireless device 14 may act in a standalone mode or with the aid of the blind aid service provider 15. In other words, the wireless device 14 need not be in contact with any security provider 16 and/or security services 18. Thus, the security provider 16 and the security services 18 are optional.

The user location may be obtained automatically through several different means. For example, the security provider 16 may automatically ascertain the user location. The user's 12 wireless device 14 may be global positioning satellite (GPS) enabled. If so, the security provider 16 may use the GPS capability of the wireless device 14 to locate the user 12. Of course, the user location may also be obtained solely by the blind aid service provider 15 via the Internet connection 13.

The blind aid service provider 15 may communicate with the wireless device 14 via an Internet connection 13. The blind aid service provider 15 may provide some of the benefits that are unavailable directly on the phone 14. For example, the blind aid service provider 15 may provide more in-depth image analysis and/or credit card processing information. Also, the blind aid service provider 15 may maintain a profile for the user 12 with additional images and/or voice patterns that are unique to that user 12. These would be functions that do not require, for example, millisecond response(s). The response times may be 2 or 3 second response times. The blind aid service provider 15 may also keep and track records of everything the user 12 is doing and therefore determines ways to improve the system 10. In other words, this is a learning system, as will be described further with reference to FIG. 2 below.

Figure 2:
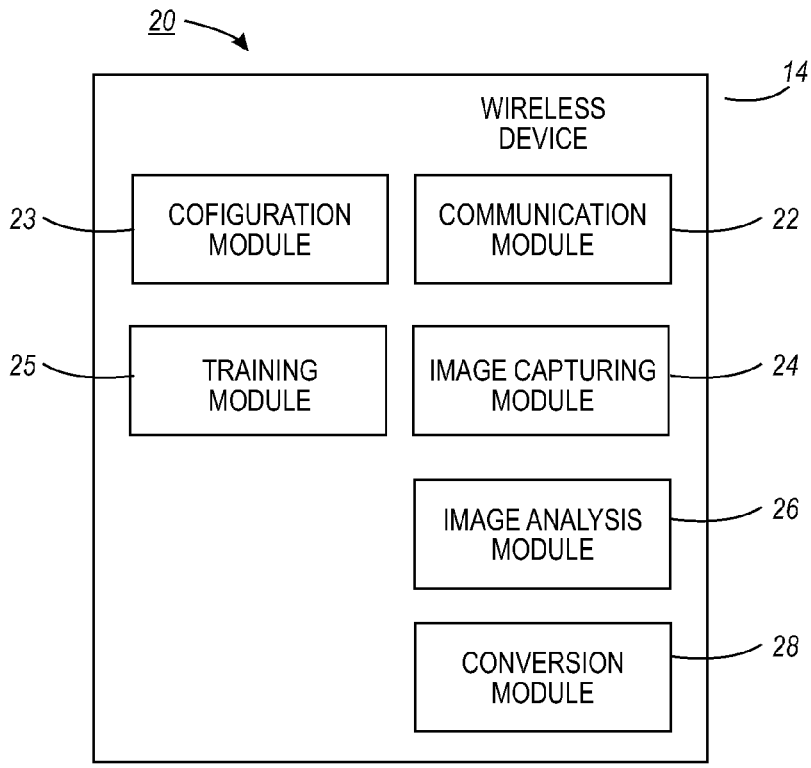
FIG. 2 is a schematic diagram of a wireless device having image capturing, image analysis, and image conversion capabilities embedded or incorporated therein, in accordance with the present disclosure.

With reference to FIG. 2, a schematic diagram of a wireless device having image capturing, image analysis, and image conversion capabilities embedded or incorporated therein, in accordance with the present disclosure is presented.

The wireless device 14 includes a bidirectional communication module 22, an image capturing module 24, an image analysis module 26, and a conversion module 28. The wireless device may further include a configuration module 23 and a training module 25.

The exemplary embodiments of the present disclosure include wireless devices having photographic capabilities. Recently available cellular phones include, for example, cameras. The cameras or image capturing module 24 may be used to take digital photographs and send the data/information wirelessly over the cellular network to a chosen destination. Such cameras may be designated as image capturing modules 24. A user 12 in possession of such a wireless device 14 having photographic capabilities may use it to his/her advantage in event of an emergency. Of course, such photographic capabilities may be used by a blind person under any type of situations (e.g., identify a person, identify a vehicle, verify monetary transaction, etc.).

In the event of an emergency, the blind user 12 may photograph his/her surroundings, or for example an assailant, and send the photographs to the security provider 16 and/or the security services 18, for example via pre-programmed keystrokes. Once the security provider 16 and/or security services 18 are contacted by the user 12, the security provider 16 and/or security services 18 ascertain the identity and location of the user 12, and receive and interpret the photographic data or image data received from the user 12. However, the photographs need not be sent to the providers 16 and 18. Instead, the photographs may be sent via the Internet connection 13 to the blind aid service provider 15. The blind aid service provider 15 may directly process and/or analyze the photographs/images directly.

Concerning the response or alert or notification configuration, several options may be available to the user 12 of the wireless device 14. For instance, a sound alarm could be used to include a voice message, such as "security has been alerted and is on the way" or a load buzzer may be used. Also, one could initiate a call to another cell phone or to the blind aid service provider 15 and one could take still photos or movies and transmit them, and/or one could record and transmit sounds.

Since an online connection has been established, the client or user 12 may speak into the phone to address the intruder or situation. Also, if the client is in the room when the intruder enters, the client may provide a name or other description to go along with the alert message. Furthermore, an alarm center may provide an oral response to the device 14 that may also be played in a loud manner. Finally, multiple response options may be combined. For instance, one may immediately place a call for help along with the location, images and sound and/or the cell phone 14 may sound an audible alarm or play a loud, pre-recorded message and/or the cell phone 14 may connect to an alarm response center that may also play a live message on the phone's receiver.

The conversion module 28 receives images from the cell phone 14 and converts the images to one or more sounds. The conversion module 28 is incorporated within the cell phone 14. Any type of converting processing circuitry may be used to convert images to sounds in real-time.

Additionally, the configuration module 23 may be used to select one or more conditions that are predetermined and require an automatic response. The user 12 may be permitted to select a different response for each condition that occurs. For example, one condition may require contacting security services 18 only, whereas another condition may require contacting both security services 18 and security provider 14. One skilled in the art may contemplate using a plurality of different configurations. Moreover, the training module 25 may be used to provide images of what the system 10 should look for. For example, the training module 25 may be programmed to determine whether a door or window has been left unlocked or becomes ajar. The training module 25 may be programmed to enable the system 10 to determine a plurality of different scenarios.

Figure 3:
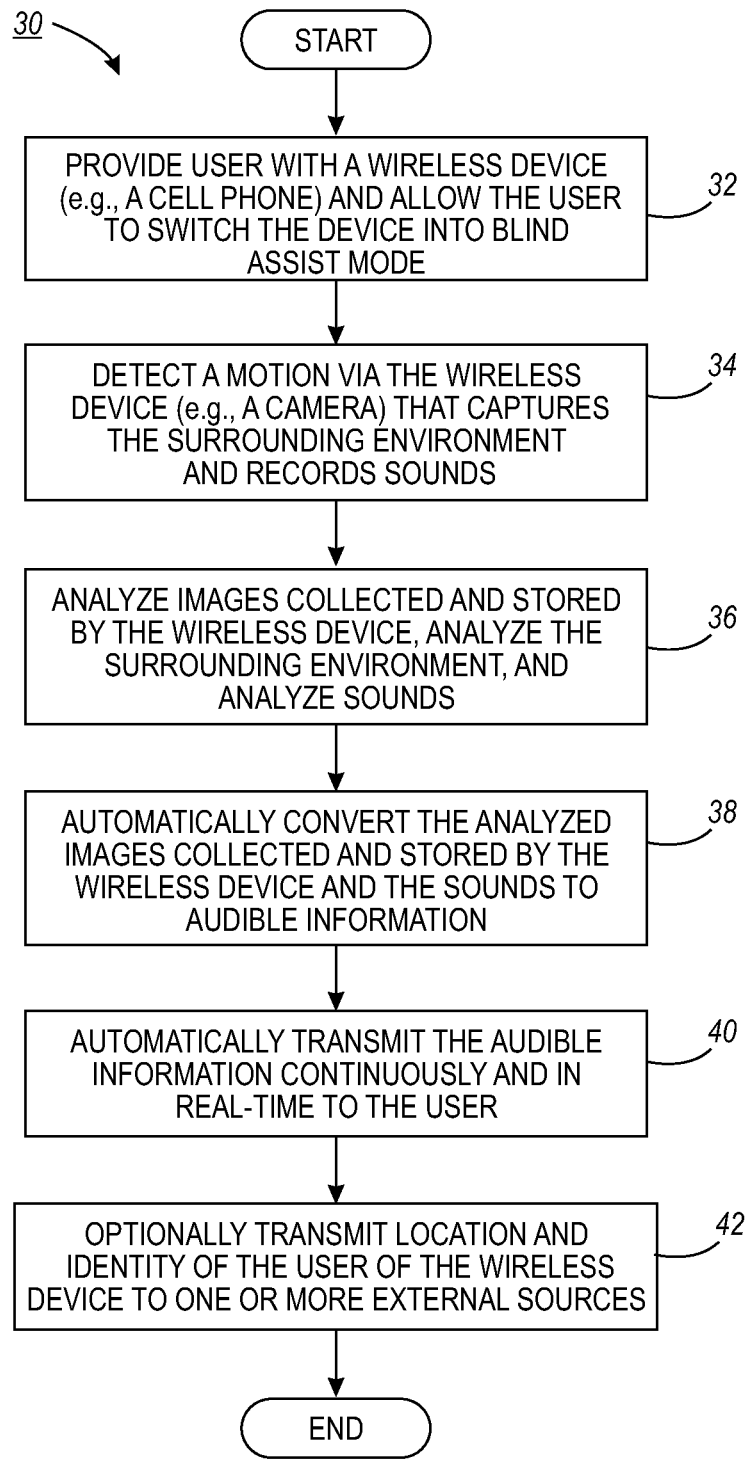
FIG. 3 is a flowchart of a method for allowing a user to bidirectionally communicate with the user's surroundings by receiving audible information from the wireless device regarding the user's surroundings, in accordance with the present disclosure.

With reference to FIG. 3, a flowchart of a method for allowing a user to bidirectionally communicate with the user's surrounding by receiving audible information from the wireless device regarding the user's surroundings, in accordance with the present disclosure is presented.

The flowchart 30 includes the following steps. In step 32, a user 12 is provided with a wireless device 14, such as a cell phone. Additionally, in step 32, the user 12 is permitted to switch the device 14 into blind assist mode. In step 34, a motion is detected via the wireless device 14 that captures the surrounding environment and records sounds. In step 36, the images, the surrounding environment, and the sounds collected by the wireless device 14 are analyzed and stored by the wireless device 14. In step 38, the analyzed images collected are automatically converted to audible information. In step 40, the audible information is automatically transmitted continuously and in real-time to the user 12. In step 42, the location of the emergency and the identity of the user 12 are optionally transmitted via the wireless device 14. The process then ends.

The blind assist mode described in FIG. 3 allows a user 12 to switch modes of the device 14. In other words, the user 12 is permitted to enter into a blind assist mode. This is a useful feature if a conventional cell phone is utilized. This feature would allow the cell phone 14 to operate in several different modes. For example, the cell phone 14 may operate in its existing mode (e.g., receiving calls) and then be switched into a blind aid mode to assist a blind person in recording/tracking/monitoring/analyzing his/her surroundings. This feature may be voice activated. However, this feature may also be mechanically activated by the user 12. Moreover, all the features of the cell phone 14 may be voice activated or manually activated by the user 12.

Figure 4:
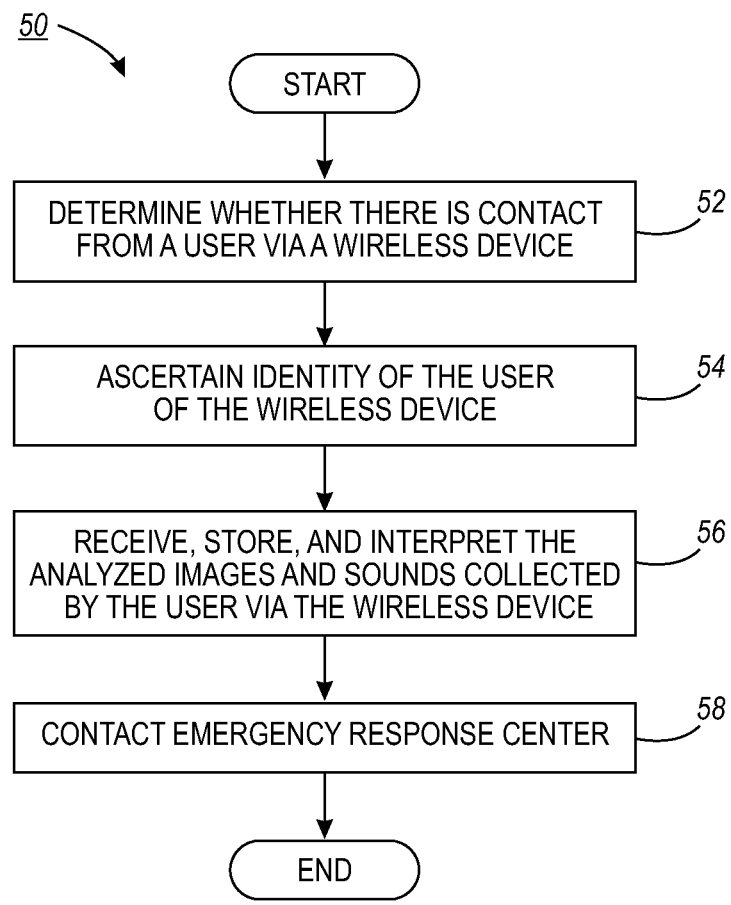
FIG. 4 is a flowchart of a method for allowing one or more external sources to receive, store, and interpret information received from the user utilizing the wireless device regarding the user's surroundings, in accordance with the present disclosure.

With reference to FIG. 4, a flowchart of a flowchart of a method for allowing one or more external sources to receive, store, and interpret information received from the user utilizing the wireless device regarding the user's surroundings, in accordance with the present disclosure is presented.

The flowchart 50 includes the following steps. In step 52, it is determined whether there is contact from a user 12 of the wireless device 14. In step 54, the identity of the user 12 is ascertained. In step 56, the analyzed images collected by the user 12 are received, stored, and interpreted. In step 58, an emergency response center is contacted regarding the emergency experienced by the user of the wireless device 14. The process then ends.

In summary, the blind aid system 10 may be implemented in a variety of environments and settings. Regardless of the environment in which the system 10 is used, it is desired to provide the location of the system in the event that the alarm is activated. The signal or alert or notification may convey the location of the system 10 to the receiver so that appropriate measures may be taken. As described, the dissemination of location by the signal or alert or notification may be effected in a variety of ways depending on preference, or the type of dwelling in which the system 10 is used, or both.

Concerning the voice activated commands, the blind person may speak the command or question and the phone would respond audibly. The blind person may hold the phone or wear it like a pendant. Optionally, the camera would always be running. There could be one or two large, easy to locate buttons for some operations, such as off/on or to take a picture. The following are exemplary verbal commands that the user 12 may speak into the phone 14:

Who is There?

The blind person 12 senses someone's presence and asks the phone 14 to identify them. If the object is not clearly in view, the phone 14 instructs the user 12 to move the phone 14 until it may take a satisfactory picture. The phone 14 may also pick up a voice pattern. The image and voice pattern are transmitted to the hosted service for analysis and identification. The combination of facial recognition and voice pattern improves the accuracy of subject recognition. The person's image would have to already be in the user's knowledge base stored with the hosted service. If it is not there, the user 12 may say "train." The person would identify themselves and their picture and voice may be stored for future reference. If the person cannot be identified the system may say so. This could also be used in dealing with multiple people at a table of at a meeting. For example, for identifying multiple people. In other words, the user is in a meeting room and wishes to know who is present. The user 12 may pan the room and use facial recognition combined with voice recognition to identify participants.

Where am I?

The user 12 utilizes GPS coordinates along with visual cues to describe where they are and what is around them such as key land marks or conditions (crowds, parades, queues, etc.).

What is this?

The user 12 places an object in from of the image capturing module 26. A series of pictures may be taken as the user 12 rotates the object. The images may be sent to the hosted service (e.g., 16 and/or 18 and/or 15) for identification.

How Much?

The user 12 may possess several paper money units. The user 12 may fan them out and place them in front of the image capturing module 26. Images are sent to the hosted service (e.g., 16 and/or 18 and/or 15) and the system 10 describes what money it sees. This option may be used when paying for an item and/or to examine the change that is received by the user 12. The system 10 could also convert foreign currencies into those familiar to the user 12.

What is the Charge Amount?

The user 12 may desire to pay by credit card but cannot see what they are signing to verify the amount. The user 12 may hold up receipt or point the camera 26 at the pin pad. The blind aid system 10 may analyze the picture and recite how much the charge is for. With this capability, a blind person 12 may use a credit card with confidence.

Is it Safe to go?

This function may require immediate response. The user 12 may slowly pan the camera 26. The system 10 is determining signs or approaching danger such as vehicles, bicycles or people. This may have to be used in used in conjunction with other functions where this is a final confirmation.

Is this the Right Bus?

This may be used in conjunction with GPS mapping software. The user 12 may describe where they want to go. For example, "I want to go to Mt. Sinai hospital." Mapping software may state that "You need to take the M16 bus at the corner of East $20^{th}$ Street and $1^{st}$ Avenue." The blind aid system 10 may help direct the user 12 to the bus stop and the camera 26 may identify the bus correctly.

Find My Object

The system 10 may be trained to recognize specific objects such as a hat, a cane, dark glasses, shoes, etc. The user 12 may recite find my "cane" and use the camera 26 to pan the room. When the object is spotted and the camera 26 is pointing at it, the voice response may be, for example, straight ahead on the night stand two feet in front of you next to the telephone.

Call Me a Taxi

The system 10 may call local taxi service and provide the user 12 with GPS coordinates, describe the user 12 as blind, wearing a red scarf and that they want to go to Grand Central Station. The phone service may confirm the request and dispatch a cab. Cabby is instructed to toot horn three times softly to indicate presence. Phone 14 may discover stopped taxi and sound pattern of 3 toots of the horn.

Identify Product

The user 12 may select items from shelf and ask "Is this rye bread?" This function may be integrated with a barcode reader.

Learn Function

This function is used to train the system 10 to recognize specific objects important to the user 12, such as his keys, his cane, his glasses, or it may be used to learn people and voices directly, by permission or indirect/automatic. Maybe someone has to audibly describe the object of person.

Alternately, a system 10 is provided for increasing a subject's safety by monitoring their surroundings using a cell phone or similar device and sending the data directly to a second cell phone or other security service for scrutiny and further actions. Data transmission from the observer cell phone may be initiated either on command by the user of the second cell phone or triggered automatically by events occurring at the observation site. Such events may include, for example, appearance of an intruder, a noise, or disturbance of the observer cell phone. In response to phone messages from the controller cell phone, the observer cell phone may send signals that activate devices located at the observation site that take action to mitigate threats. Such actions include, for example, sounding an alarm, triggering a fire extinguisher, releasing a repellant agent, or turning on lights. The observer cell phone is also capable of placing phone calls to local response teams, either automatically in response to a local event, or on command from the controller cell phone. The controller cell phone may store data received from the observer cell phone either locally or on a remote machine. The controller cell phone may also relay data from the observer cell phone to appropriate response teams, either automatically or on command.

Additionally, alarm messages sent to emergency response units may be pre-composed and augmented with supplemental data about the subject that may help responders reach the area more quickly and perform more effectively once they reach the scene of the disturbance. Such information includes, for example, the subject's location, sex, age, height, and clothing color. The content of the pre-composed messages may be tailored for the type of emergency response unit being contacted.

Moreover, the blind person may receive aural confirmation of the user inputs. Blind users of the present disclosure may derive three salient benefits from such feature. First, by having a training aid, it is possible for them to spend time alone, memorizing the functions and locations of keys on their controllers. Second, by being able to optionally hear aural confirmations as utterances as to their user inputs, before committing to transmit them, the likelihood is greatly reduced of their making mistakes whether caused by a slip of memory or a slip of the finger. Third, should a mistake happen anyway, by knowing which command was actually transmitted, they may better be able to correct the situation themselves. These collective benefits of the present disclosure serve to both help the self-esteem and also to support the independent living of persons without sight.

Thus, some of the advantages of the present disclosure include aiding the blind in using credit cards with confidence, going shopping and being able to recognize products, and exchange money without fear of being cheated. Also, blind people may be able to find specific personal objects, identify people and situations and walk about with a new level of confidence.

Furthermore, the exemplary embodiments of the present disclosure may be implemented as an application that runs on a cell phone or other portable electronic device. The application may be started and the phone's camera would continuously watch the area it's pointed or directed at. Capabilities of that application may include the following. (i) Sensitivity calibration, that is, the application's software would be able to distinguish and identify changes in the environment (i.e., motion detection), such as the approach of a person or animal, smoke detection, signs of a struggle, and other activities that may be discovered through motion detection. (ii) Image analysis, that is, providing image analysis software that may recognize and classify images based on their content. The images analysis system may be trained to look for an open door, fire, a person or other condition. (iii) The application may be configured to transmit information about what it is capturing to a specific person, phone number, or other destination or external source. Consequently, the analysis of the images by the cell phone acts as a triggering mechanism for contacting a plurality of external sources to warn of an emergency. Moreover, a plurality of cameras may be linked together into a networked system to provide for even greater assistance.

Additionally, the portable blind aid system 10 may record and store the information gathered (e.g., the emergency situations). Such data or information or history logs may be stored separately in a local or remote database for further processing. This may be a unique database designed solely for storing and analyzing such different types of data or information. Also, once a history of the emergencies is collected and stored for each of the cell phones, that history may be evaluated in the future for determining which emergencies were real and which were false. In other words, the emergencies that took place for each cell phone may be stored and later compared against each other (e.g., for the same cell phone or for a plurality of different cell phones) and ranked in order of most emergencies, least emergencies, most valid emergencies, most false emergencies, etc. All this data/information may be tracked with the use of a data tracking module and analyzed with a data analyzing module in accordance with a data bank of emergencies.

The image recognition software program may be packaged and distributed as a software package for downloading to the cell phone where the set of programmable instructions are stored within at least one computer-readable medium, such as a CD-ROM, diskette, etc. The image recognition software program may also be downloaded to the cell phone or other portable electronic device through a network connection connecting the cell phone to a remote computer station, such as a remote server.

Further, although aspects of the present disclosure have been described herein in the context of several particular implementations in particular environments for particular purposes, those of ordinary skill in the art will recognize that its usefulness is not limited thereto and that the present disclosure may be beneficially implemented in any number of environments for any number of purposes.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A blind aid device, comprising:
   an image capturing module, said image capturing module capturing one or more images related to a user's surrounding environment;
   an image analysis module in operable communication with the image capturing module, the image analysis module configured to (i) detect moving objects from the one or more images captured, (ii) identify a finite number of spatial relationships related to the moving objects, (iii) classify the finite number of spatial relationships related to the moving objects with predefined moving object data to obtain select spatial relationship information and (iv) perform facial recognition on said one or more images captured containing a person;
   a configuration module configured to allow user selection of events that are actionable and corresponding responses for each of said actionable events;
   a training module configured to identify, utilizing said finite number of spatial relationships, said actionable events in said user's surrounding environment;
   a conversion module configured to convert the select spatial relationship information and actionable events into audible information; and
   a communication module for relaying the audible information to the user.

2. The blind aid device according to claim 1, wherein the blind aid device comprises a cell phone.

3. The blind aid device according to claim 1, wherein the image capturing module comprises a camera.

4. The blind aid device according to claim 1, further comprising a Global Positioning System (GPS) for relaying a location of the user to one or more external sources.

5. The blind aid device according to claim 1, wherein the audible information is derived by interpreting one or more of the following: height, distance, and color measurements, approaching and receding objects, depth perceptions, bar code data, vehicle and people identification, and identification of conditions.

6. The blind aid device according to claim 1, wherein the image analysis module further identifies one or more persons in the user's surrounding environment by comparing current visual images to previously stored visual images.

7. The blind device according to claim 1, wherein the image analysis module further identifies one or more persons in the user's surrounding environment by comparing current voice patterns with previously stored voice patterns.

8. The blind aid device according to claim 7, wherein the image analysis module further identifies one or more persons in the user's surrounding environment by comparing current visual images to previously stored visual images.

9. The blind aid device according to claim 1, wherein the spatial relationship information related to the one or more analyzed images and the blind person's surrounding environment are transmitted to one or more external sources, the one or more external sources used for contacting and sending aid to the user.

10. A method implemented by a blind aid device, the method comprising:
    capturing one or more images related to a user's surrounding environment;
    detecting moving objects from the one or more images captured;
    identifying a finite number of spatial relationships related to the moving objects;
    analyzing the one or more images within the blind aid device to classify the finite number of spatial relationships related to the moving objects corresponding to predefined moving object data and to identify persons contained in said one or more images utilizing facial recognition;
    receiving user selection of events that are actionable;
    identifying said selected actionable events in said user's surrounding environment utilizing said finite number of spatial relationships;
    converting select spatial relationship information related to the one or more analyzed images and said actionable events into audible information; and
    relaying select audible information to the user.

11. The method according to claim 10, wherein the blind aid device comprises a cell phone.

12. The method according to claim 10, wherein the image capturing module comprises a camera.

13. The method according to claim 10, further comprising a Global Positioning System (GPS) for relaying a location of the user to one or more external sources.

14. The method according to claim 10, further comprising deriving audible information by interpreting one or more of the following: height, distance, and color measurements, approaching and receding objects, depth perceptions, bar code data, vehicle and people identification, and identification of conditions.

15. The method according to claim 10, further comprising identifying one or more persons in the user's surrounding environment by analyzing and comparing current visual images and current voice patterns to stored visual images and voice patterns stored on a data storage unit located within the blind aid device.

16. The method according to claim 10, further comprising transmitting the spatial relationship information related to the one or more analyzed images and the user's surrounding environment to one or more external sources, the one or more external sources used for contacting and sending aid to the user.

17. The method according to claim 10, wherein the image analysis module further identifies one or more persons in the user's surrounding environment by comparing current voice patterns with previously stored voice patterns.

18. The method according to claim 17, wherein the image analysis module further identifies one or more persons in the user's surrounding environment by comparing current visual images to previously stored visual images.

19. A blind aid system, comprising:
a processor;
a computer-readable storage medium in communication with the processor, the computer-readable storage medium comprising one or more programming instructions for:
capturing one or more images related to a blind person's surrounding environment;
detecting moving objects from the one or more images captured;
identifying a finite number of spatial relationships related to the moving objects;
analyzing the one or more images within the blind aid device to classify the finite number of spatial relationships related to the moving objects corresponding to predefined moving object data and to identify persons contained in said one or more images utilizing facial recognition;
receiving user selection of events that are actionable;
receiving user election of device responses for reach of said selected actionable events;
identifying said selected actionable events in said user's surrounding environment utilizing said finite number of spatial relationships;
converting select spatial relationship information related to the one or more analyzed images and said actionable events into audible information; and
relaying select audible information to the user.

20. The blind aid system according to claim 19,
wherein the blind aid device comprises a cell phone and the image capturing module comprises a camera;
wherein the audible information is derived by interpreting one or more of the following: height, distance, and color measurements, approaching and receding objects, depth perceptions, bar code data, vehicle and people identification, and identification of conditions; and
wherein one or more persons in the user's surrounding environment are identified by analyzing and comparing current visual images and current voice patterns to stored visual images and voice patterns stored on a data storage unit located within the blind aid device.

* * * * *